US006315001B1

(12) United States Patent
Anderson

(10) Patent No.: US 6,315,001 B1
(45) Date of Patent: Nov. 13, 2001

(54) HOSE MANAGEMENT/CONTAMINATION BARRIER DEVICE

(76) Inventor: Ladd Anderson, 2350 Arbor La., Holladay, UT (US) 84124

( * ) Notice: Subject to any disclaimer, the term of this patent is extended or adjusted under 35 U.S.C. 154(b) by 0 days.

(21) Appl. No.: 09/676,760

(22) Filed: Oct. 2, 2000

(51) Int. Cl.[7] .................................................. F16L 3/01

(52) U.S. Cl. .......................... 138/106; 138/110; 138/156; 138/178

(58) Field of Search .................................... 138/106, 107, 138/110, 156, 178

(56) References Cited

U.S. PATENT DOCUMENTS

| | | | | |
|---|---|---|---|---|
| 2,102,010 | * | 12/1937 | Kopp | 138/110 |
| 3,924,661 | * | 12/1975 | Bornhoffer | 138/110 |
| 4,483,564 | * | 11/1984 | McDaniel | 138/106 |
| 4,805,933 | * | 2/1989 | Swisher | 285/38 |
| 5,160,811 | * | 11/1992 | Ritzmann | 174/68.3 |
| 5,316,348 | * | 5/1994 | Franklin | 138/110 |
| 5,560,397 | * | 10/1996 | Miller et al. | 138/110 |
| 5,771,941 | * | 6/1998 | Almeida | 138/110 |
| 5,901,730 | * | 5/1999 | Tisbo et al. | 137/15.01 |
| 6,167,914 | * | 1/2001 | Koteskey | 138/110 |

* cited by examiner

*Primary Examiner*—James Hook
(74) *Attorney, Agent, or Firm*—Brian C. Trask

(57) ABSTRACT

A device to assist in guiding a hose onto a spool while protecting a user's hand from friction and debris or contamination carried by the hose. The device is a slotted cylinder having a through-bore and which may be installed onto the hose at any point along its length. Preferred embodiments have flared open ends and a spiral slot which may be expanded to accommodate hoses of different diameter. The device may be "cocked" with respect to the hose to provide friction and apply an axially directed force to the hose.

10 Claims, 7 Drawing Sheets

1
2
3
3
3
4

1
2
3

1
3

HOSE MANAGEMENT/CONTAMINATION BARRIER DEVICE

CROSS REFERENCE TO RELATED APPLICATIONS

Not applicable.

STATEMENT REGARDING FEDERALLY SPONSORED RESEARCH OR DEVELOPEMENT

Not applicable.

REFERENCE TO MICROFICHE APPENDIX

Not applicable.

BACKGROUND OF INVENTION

1. Field of the Invention

The present invention relates to the management of flexible hose, flexible hose storage reels, and to flexible hose and storage reel accessories. More specifically, the present invention relates to the reduction of the potential for operator exposure to chemical and other contaminants which may be conveyed via hose casings to hose storage reel device operators as they hand-feed flexible hoses back onto storage reels during the hose retraction process. The present invention further relates to improving the hose reel operator's ability to more safely, efficiently and accurately direct flexible hose onto the storage reel during the retraction process.

2. Related Art

Certain application industries, particularly liquid and/or compressed gas application industries, i.e., those that involve the delivery of hose-conveyed and/or hose-dispensed liquids, solids and/or gases, a list of examples might include but shall in no way be construed to be limited to pesticide applications, commercial weed control and other herbicide applications, liquid lawn treatment applications, carpet cleaners, high pressure cleaners, compressed gas, solvent and lubrication applications, airport power washers and de-icing equipment, sand blasters, industrial painters, detergent applicators, pressure lubricating equipment operations, firefighters, and other service, manufacturing, application and delivery industries, depend upon the deployment and retraction of flexible hose during the course of their respective delivery processes. These hoses are often and typically deployed at the delivery site from storage reels and retrieved back onto those reels when the application process is complete.

During the hose retrieval process in manual applications, the operator usually activates the winding feature of the reel, whether motor switch or manual crank, with one hand while using the other hand to direct the inbound hose back onto the reel. It is primarily during the retrieval process that the present device provides the greatest protection and utility by diminishing the potential for a contaminated hose casing to contact the operator's hands, gloves and clothing.

3. Prior Art

There are U.S. Patents relating to flexible hose management via storage reels, i.e. U.S. Pat. Nos. 2,738,143; 2,906,472; 3,176,931, as well as patents on hose design and hose end attachments and application devices. However, no single, similar device is known to have ever been designed to address the specific needs, concerns, purposes, innovations, safety applications, or degree of simplicity and economy as the device described herein. Consequently, the inventor has been unable to discover any related or prior patent art of any kind.

SUMMARY OF THE INVENTION

The principal object, and not to be construed as an only object, of the present invention is to reduce the potential for operator exposure to chemical residues, fertilizers, animal excrement, herbicides, and any other known or unknown contaminant in residence at an application/delivery environment, or resulting from the application process, may be caused to accumulate on the casing of a flexible hose as it is dragged over or through a contaminated surface, oversprayed, contaminated by a leak in the hose itself, or otherwise saturated with potentially harmful chemicals, biological hazards, abrasives, or any other known or unknown contaminant which may accumulate on the hose case during the dispensation, retrieval and/or manipulation of the hose during the application/delivery process.

Another object of the present invention is to provide the operator a mechanically safe, effective, inexpensive means of guiding flexible hose back onto the storage reel with an improvement of ease, control and accuracy over other known methods, and to otherwise and generally manage the hose more effectively in the respective environment.

A further object of the present invention is to provide operators and applicators with a more effective means of changing, as is frequently necessary, the direction at which retractable hose is fed onto the reel; e.g., by bracing the installed device against the angle of resistance, an inbound hose can be better directed and controlled onto the reel at the more preferred angle (see Detailed Description of Drawings FIG. 4).

Yet another object of the present invention is to provide a mechanical means by which the operator can assist motor-powered hose retraction devices, in that it provides mechanical means by which an operator, by camming the opposing inside ends of the installed device against the hose, may create friction points whereby he can physically push the hose toward the reel during the hose retraction process, release the device to a position parallel with the tensioned hose, draw the device back to the original position and repeat. A mechanical assist is thereby provided whereby the operator can help a motor-powered or hand powered retraction device overcome the effects of inertia, friction and drag that so frequently encumber the hose retraction process.

The inside diameter of the preferred embodiment is relatively and uniformly larger at its ends, diminishing and tapering toward the center. The feature serves to (1) funnel the hose and fittings into the device at either end with less friction and (2) create a uniform, non-biting inside radius, on the occasion the device is used as a direction change for traveling hose as described in FIG. 4.

It is also an object of the present invention to provide such a device via simple, inexpensive construction, so as to avail these objectives to commercial, professional and domestic consumers at reasonable cost.

The foregoing objectives can be accomplished by providing the hose management/contamination barrier device described herein.

BRIEF DESCRIPTION OF DRAWINGS

Refer now to FIG. 1, which represents a preferred embodiment in accordance with the present invention.

DETAILED DESCRIPTION

Figures 1, 2, 3:
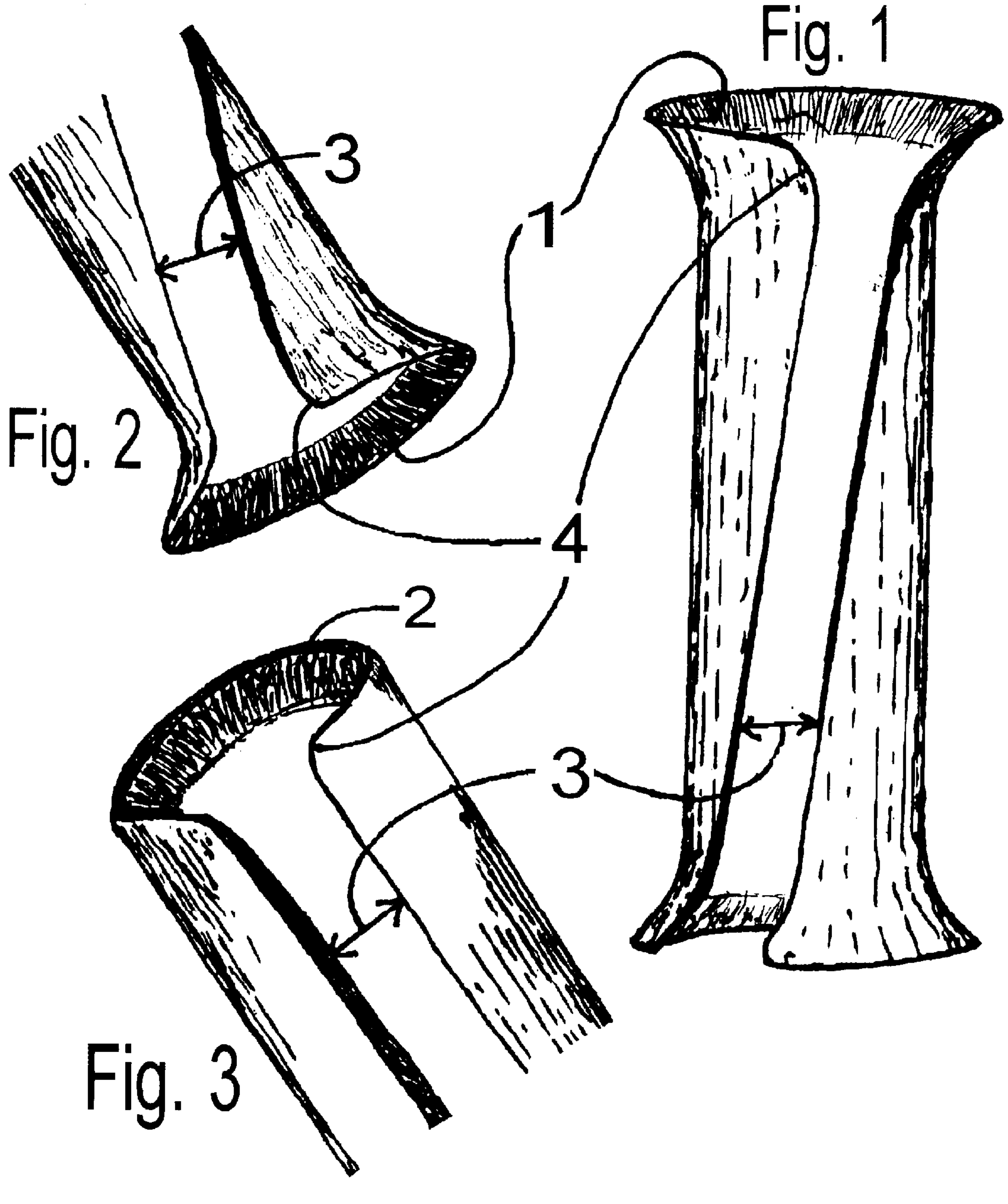
FIG. 2 represents a fragmented view of either end of the preferred embodiment represented in FIG. 1.
FIG. 3 represents a fragmented view of a more thickly-walled and equally preferred embodiment variation of the embodiment represented in FIG. 1, permitting beveling or rounding of the inside radii at its ends in lieu of and achieving the benefits of the flared ends depicted in FIG. 1.

As shown in the drawings, the hose management/contaminant barrier device in accordance with the preferred embodiment of the present invention includes the formation by machining, molding, milling, injection molding, or formation by other means of suitable material(s), including but not construed to be limited to: injection molded and/or molded and/or milled or otherwise formed or fabricated plastic, metal, nylon, polyvinyl chloride (PVC), acrylonitrile-butadiene-styrene (ABS), or any other type of sufficiently rigid material into an open-sided sleeve that is flared, the inside of which is inwardly tapered, and/or rounded or beveled at the inside of either end. The inside diameter may but not necessarily funnel gradiently and radially toward the center, the inside diameter at that point dependent upon the diameter of hose the particular model is being designed to address, as are the overall length, inside diameters and other dimensions of the device.

Variations in the preferred embodiment of the present invention may be necessary so as to accommodate specific hose flexibility and diameter, specific chemical resistance requirements, degree of user protection and friendliness requirements, economy of production considerations, some exemplary descriptions of which are represented in FIGS. 1, 9, 10, 11, 13, 14.

Figure 4:
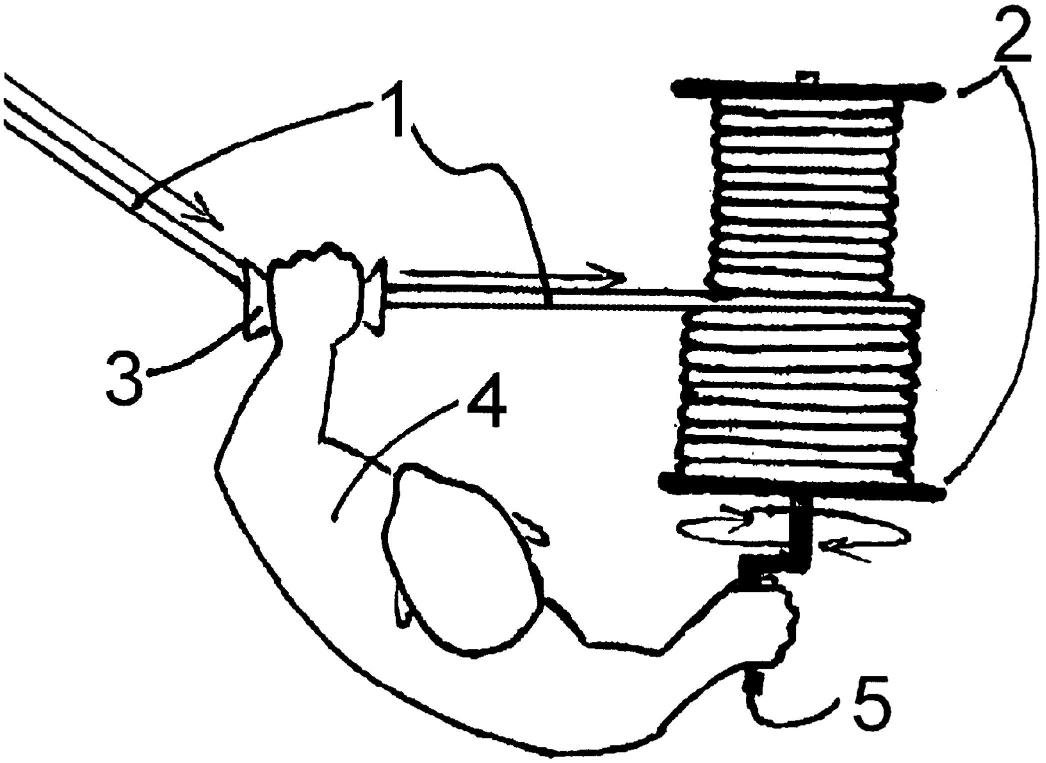
FIG. 4 represents a top view of an operator using an embodiment of the device in one of its typical applications.

As suggested in FIGS. 1, 2, 3, the inside ends of the present invention may be flared 1, radially funneled toward the center and/or rounded or beveled 2 to assist in the shedding of hose casing residues away from the operator's hand or glove during a hose management process, e.g. the hose retraction process depicted in FIG. 4, as well as to channel the hose into the device under less friction and potential for snagging than might be expected from other embodiments of the same device with less finished or non-funneling inside edges.

The more acute ends of the installation slot 4 in FIGS. 1, 2, 3 needn't be finished. They are, however, rounded in the preferred embodiments in the interest of operator safety and the minimization of the potential for hose damage, snagging and/or the potential for fitting hang up due to an exposed corner or edge, particularly relevant to applications wherein it is specified that the device be fashioned or milled from metal.

The installation slot in the hose management device/contamination device described in 3 in FIGS. 1, 2, 3 and further depicted in FIGS. 9, 10, 11, 13, 14 shall be of a width sufficient to install the device on to the various hose diameters that the differing models may be designed to accommodate. The installation slot 3 in FIGS. 1, 2, 3, 11, 12, 13, 14 of these examples is milled or molded so as to open the length of the device thereby allowing the device to be easily installed onto the hose via fixed opening, e.g. 1 in FIGS. 9, 10, 11, 13, 14 or via hinged collar, FIGS. 11 and 12. The installation slot already described may be parallel with the central axis of the device, however the preferred orientation of same is (with the exception of FIGS. 11, 12 wherein the hose containment problem is solved by complete enclosure) oblique by design, thereby creating offset entry and exit shoulder points so as to help insure hose containment within the device during its employment, a typical application of same described in the drawing of the retraction process FIG. 4.

FIG. 4 describes an operator employing the device in a typical application, wherein 1 is the an inbound hose traveling toward and being directed onto a storage reel 2 by the device 3 in the hand of the user 4.

Figure 5:
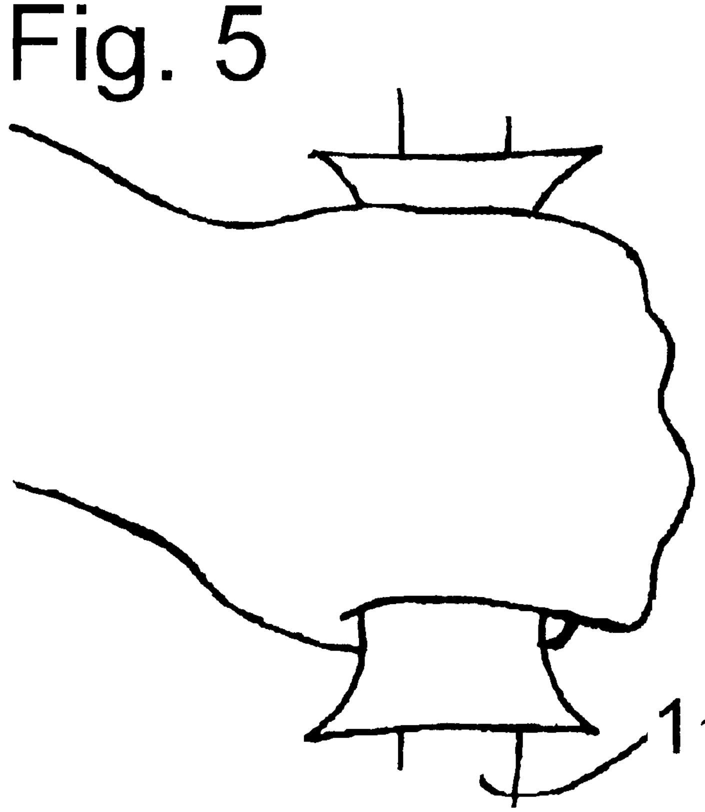
FIG. 5 describes the device in a user's hand in its typical orientation to the hose 1 contained therein.
Figure 6:
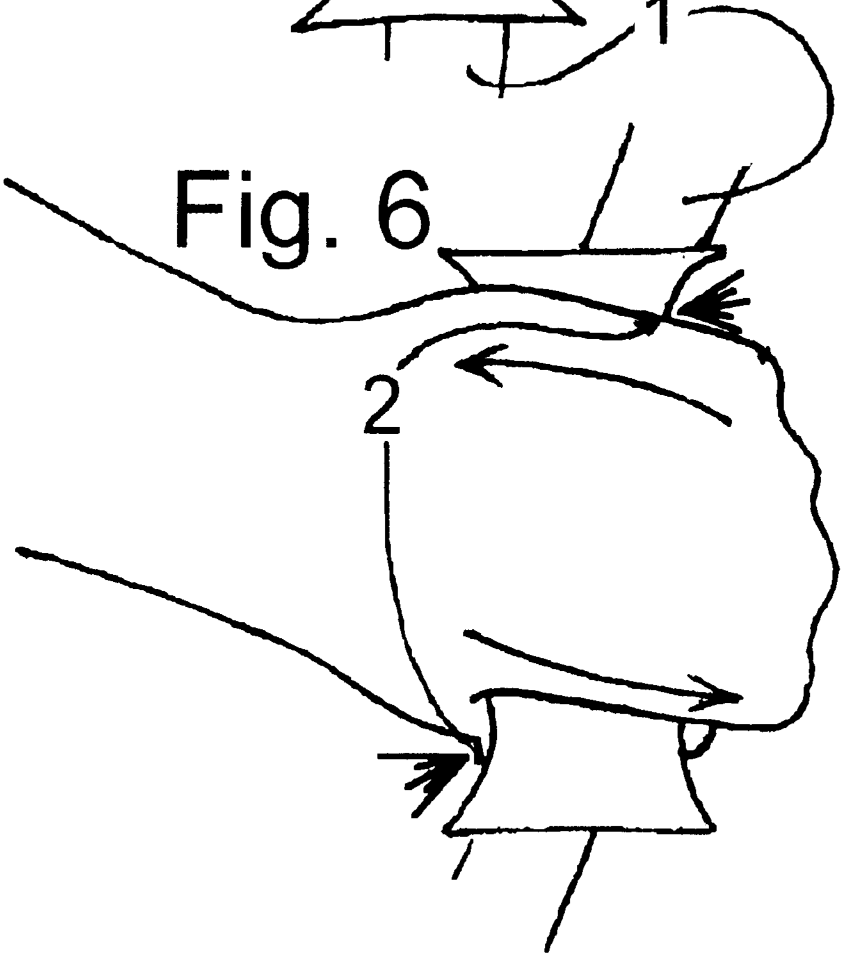
FIG. 6 describes the device in a user's hand in an attitude that creates the braking/mechanical assist friction points 2 advantage of the device.
Figure 7:
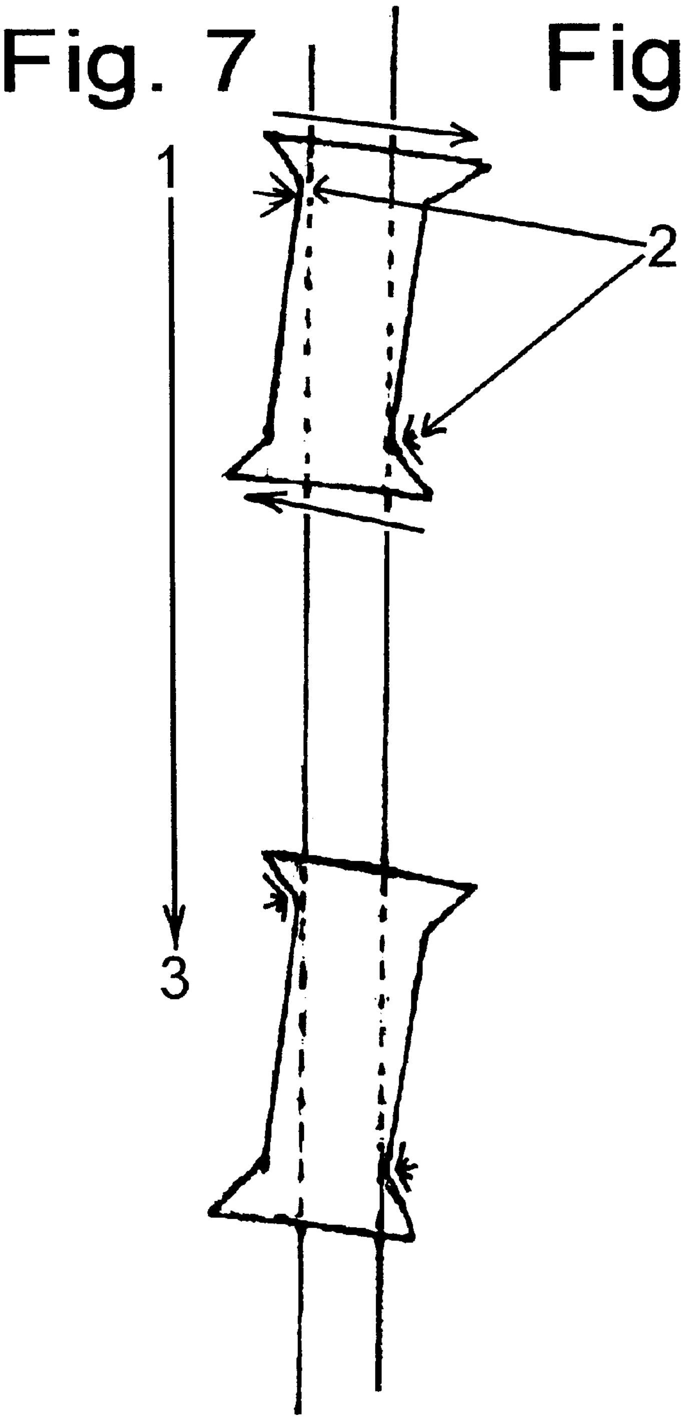
FIG. 7 and FIG. 8 describe the mechanics of how the device can be used as a brake via the friction points or as an assistance to push sections of hose toward the reel during the hose retrieval process, returned to parallel and the original position and repeated as necessary, thereby providing assistance to the take up mechanism of the reel, whether that mechanism be powered by engine, motor, or manually.
Figure 8:
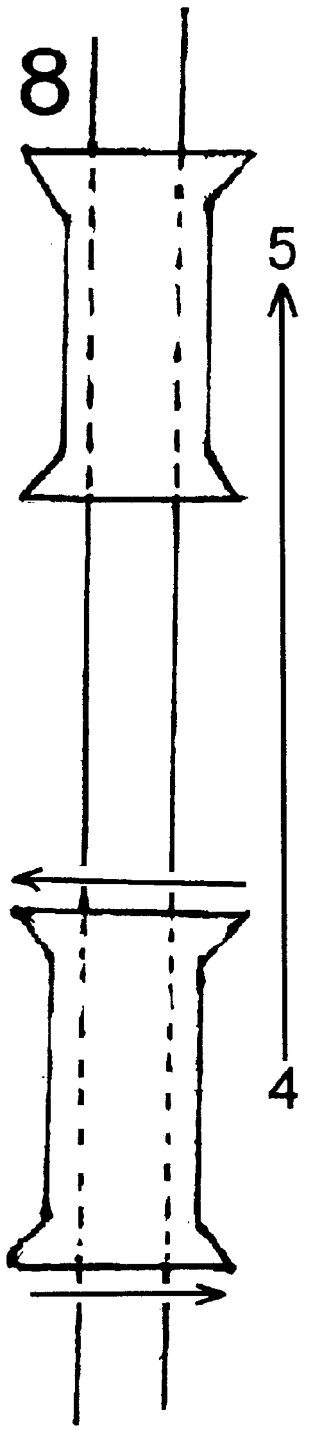

By the user changing his hand from the running attitude of the device FIG. 5 the hose gripping attitude of the device FIG. 6, the opposing inside ends of the device may, by the user, be leveraged against the hose 1 so as to create friction points 2, whereby the operator can use the device to afford himself convenience in pulling hose from the reel, as a braking mechanism to slow and/or prevent hose overruns on to the reel and, in the case of an inbound hose, as an assistance in pushing the hose toward the reel during the retrieval process as per 1–3, 4–7 in FIG. 7. Referring still to FIG. 7, the device may then be returned to parallel 4, drawn back to the original position 5 to gain another purchase via friction points 2, and repeated as required 1–3, 4–5, 1–3, etc. The action provides an effective means of overcoming friction due to the resistance, friction and drag which often overcome the reel's power source to retrieve a fully deployed hose, a condition that frequently encumbers the hose retraction process.

Figures 9, 10:
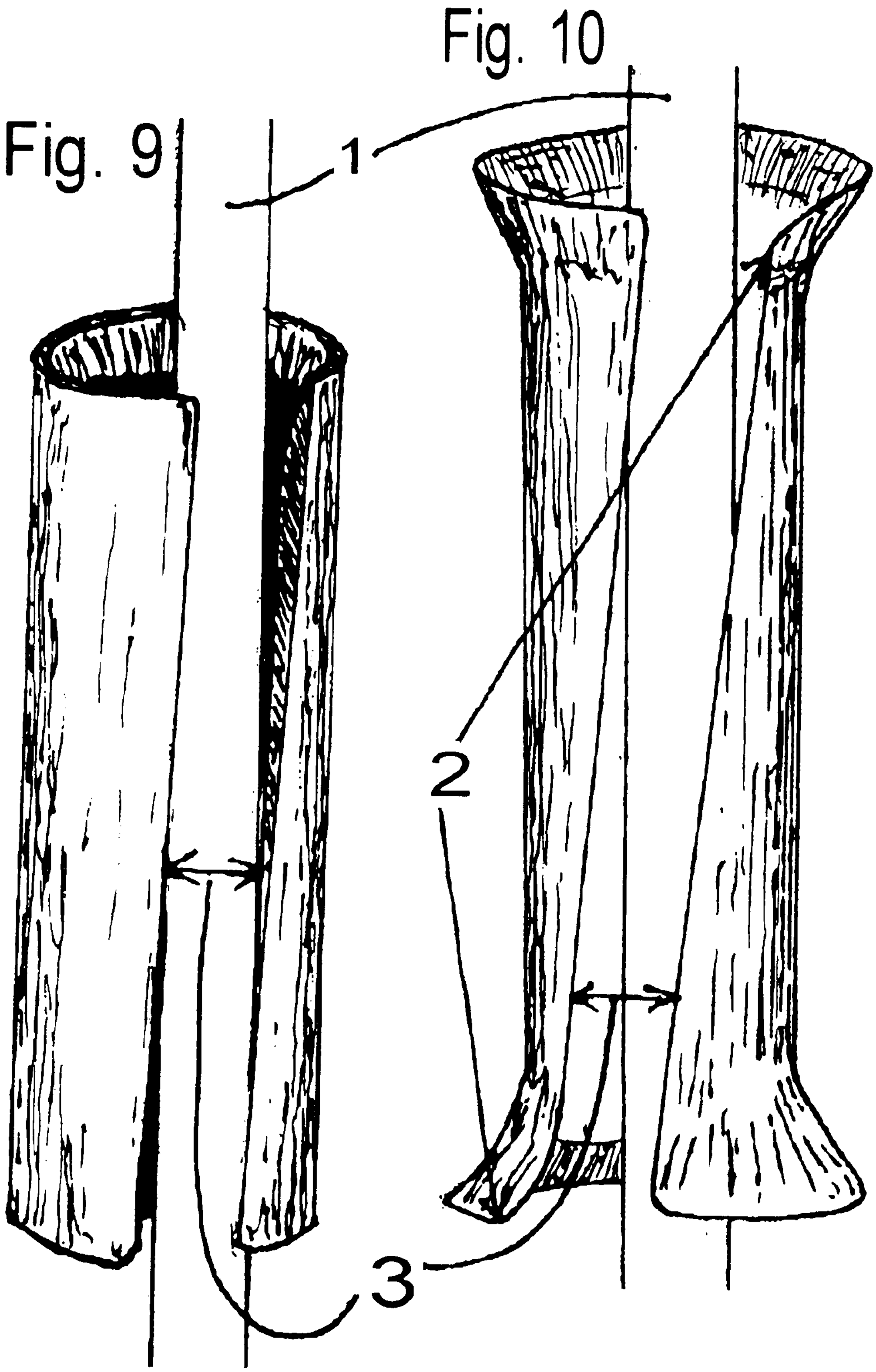
FIG. 9 and FIG. 10 provide side views of the preferred embodiments of the present invention, suggesting how a tensioned hose is contained within the device by the offset installation and removal slot.

FIGS. 9, 10 describe the preferred embodiments of the device installed on a hose 1 via the expansion slot 3 and contained by the diagonally opposed shoulder points 2.

Figures 11, 12:
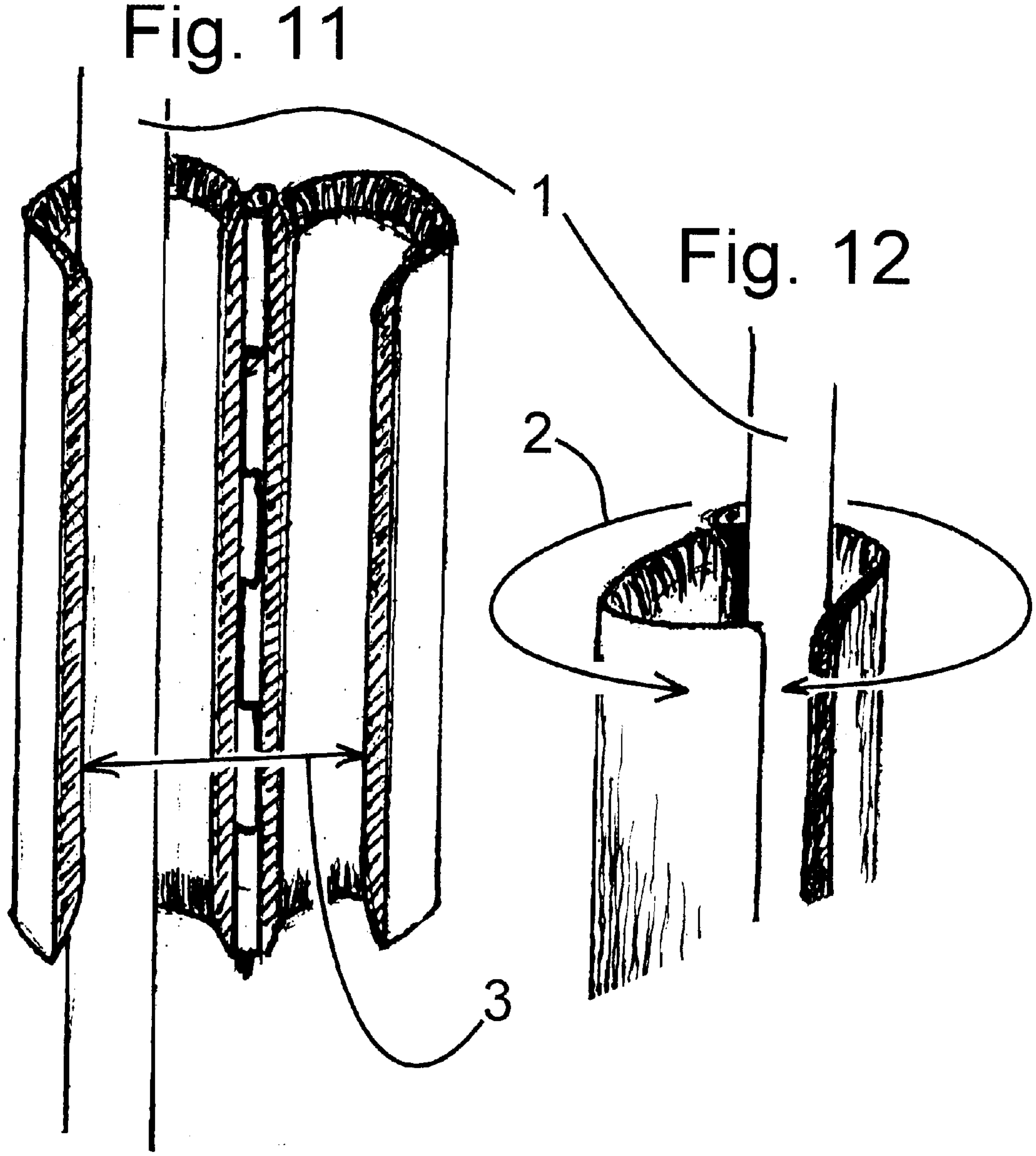
FIG. 11 and FIG. 12 describe a hinged or hinge-like embodiment wherein the device opens, installs on the hose, and closes around and contains the hose via hinge or hinge-like molding.

FIGS. 11, 12 describe a hinged or hinge-like embodiment of the device wherein one long axis side of the device is connected via hinge or flexible molding, allowing the opposite side 3 to be opened so as to allow this embodiment of the device to receive the hose 1 and then closed to contain the hose 2, thereby affording the user the advantages and containment protections of the oblique slot embodiments described in the patentor's claims, descriptions, and elsewhere herein.

Figures 13, 14:
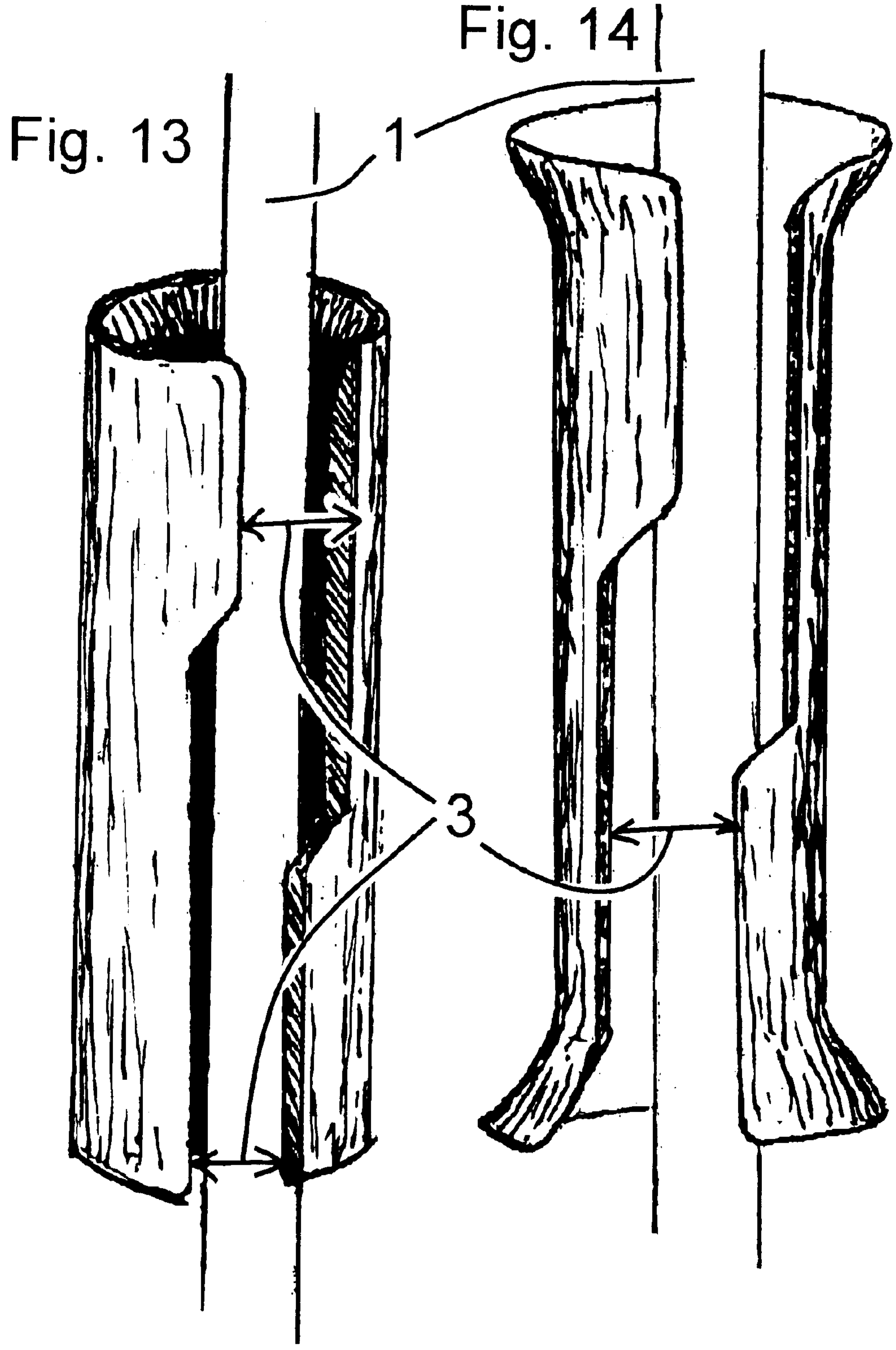
FIG. 13 and FIG. 14 describe one of the possible milling or molding variations for the installation slot described in FIGS. 1, 2, 3 and 8.

FIGS. 13, 14 describe embodiments of the device wherein the hose containment advantage of the off-axis installation slot angle is achieved by slot lines that are essentially parallel to the long axis of the device 3 but that originate from points on either end of the device that are slightly offset from one another 2, thereby creating the same and desirable hose containment effect of the more obliquely designed installation slots described for the preferred embodiment and other embodiments of the device already and thoroughly described.

The foregoing description of the preferred embodiments and other embodiments of the invention have been presented for the purposes of illustration and description only. They are not intended to be exhaustive or to limit the invention to the precise forms disclosed, nor is it to be implied by the foregoing drawings or descriptions that the device be limited to flexible hoses or manual, handheld operations. Many modifications and variations are possible in light of the above teaching. It is intended that the scope of the invention be limited not by these detailed descriptions, but rather by the claims appended hereto.

Although the textual description of the device describes its application to flexible hoses and hose storage reels only, the inventor hereby notices that the device and/or variations of its embodiments may afford one or more of these advantages in the management of any flexible, linear, tubular, linked, braided, wound or solid connecting, retrieval or delivery means exampled by but not to be construed to be limited to: steel cable; wire rope; electrical cable and cord; fiber optical cable; any and all types, weaves, strands and braids of natural and synthetic ropes, twines and lines; chain motor chains; chain and/or any linkage or connection device that can be defined or employed as chain; home, garden, industrial and commercially employed water hoses, and any other flexible, linear, dispensing and/or connecting and/or retrieving invention that, at the determination of a prospective user, may be more effectively and/or efficiently managed by the employment of the preferred embodiment of the device, or any embodiment of the device, or any other device that can be determined to be a similar derivative of the above teaching.

The hose reel(s) defined and illustrated herein are hereby construed to be representative of any power source which creates tension on any of the examples named in the preceding paragraph whereby a situation is created in which the device(s) described and illustrated herein may, at the determination of the user, be advantageously employed.

I claim:

1. A device which may be installed onto a hose at any point along its length to assist in guiding said hose onto a spool while protecting a user's hand from friction and debris or contamination carried by said hose, and through which installed device said hose may freely slide in a direction corresponding to said length, the device comprising:

a sleeve formed by a wall approximately circumferentially disposed about a central axis, said wall comprising first, second, third, and fourth ends, and substantially defining a though bore, between said first and second ends, in which to receive said hose; and a slot formed in said wall between said third and fourth ends and spanning between said first and second ends, said slot being adapted for retention of said hose in said through-bore of an installed device.

2. An apparatus according to claim 1, wherein:

a length of said slot may be increased to a length sufficient to accommodate a diameter of said hose for transverse placement of said hose into said through-bore.

3. An apparatus according to claim 1, wherein:

said slot is arranged substantially parallel to an axis of said device.

4. An apparatus according to claim 1, wherein:

said slot is arranged in oblique alignment with an axis of said device.

5. An apparatus according to claim 1, said first end comprising:

a beveled opening adapted to reduce structural interference with structure carried by an in-travelling hose.

6. An apparatus according to claim 1; wherein said device is constructed and arranged such that rotation of said device about an axis transverse to said hose places structure carried by said first and second ends into frictional engagement with said hose whereby to permit imparting an axially directed force into said hose.

7. A hand-held hose guide to assist in rewinding a length of flexible hose onto a spool, said guide being constructed such that a user's hand is substantially shielded from contact with an external surface of said hose, said guide being adapted to install circumferentially onto a hose at any point along a length of said hose, said guide comprising:

a conduit having first and second ends spaced apart by a distance sufficient to accommodate a user's hand, the inside surface of said conduit being adapted for low friction engagement with an exterior surface of said hose when said guide is oriented with an axis of said guide substantially parallel to an axis of said hose.

8. A guide according to claim 7, further comprising:

a slot formed in said conduit between said first and second ends, said slot being adjustable in width to accommodate transverse placement therethrough of a length of said hose.

9. A guide according to claim 7, further comprising:

a flared opening at said first end to accommodate protrusions from said surface of said hose whereby to resist creation of a structural interference which would restrict passage, in an axial direction, of said hose therethrough.

10. A guide according to claim 7, wherein said guide is constructed and arranged such that rotation of said guide about an axis transverse to said hose places structure carried by said first and second ends into frictional engagement with said hose whereby to permit imparting an axially directed force into said hose.

* * * * *